United States Patent [19]

Mraz et al.

[11] Patent Number: 4,976,571
[45] Date of Patent: Dec. 11, 1990

[54] ANCHOR DEVICE FOR SECURING ROCK BOLTS

[75] Inventors: Dennis Z. Mraz; Anil Mahyera, both of Saskatoon, Canada

[73] Assignee: Engineered Instruments, Inc., Saskatoon, Canada

[21] Appl. No.: 505,367

[22] Filed: Apr. 6, 1990

[51] Int. Cl.⁵ ............................................. E21D 20/02
[52] U.S. Cl. .................................. 405/261; 405/260; 405/259; 411/82
[58] Field of Search ............... 405/261, 260, 259, 258; 411/82

[56] References Cited

U.S. PATENT DOCUMENTS

| | | | |
|---|---|---|---|
| 4,279,340 | 7/1981 | Lang | 405/261 X |
| 4,528,792 | 7/1985 | Cross et al. | 405/261 X |
| 4,620,406 | 11/1986 | Hügel et al. | 405/216 X |
| 4,820,095 | 4/1989 | Mraz | 405/261 X |

Primary Examiner—Dennis L. Taylor
Assistant Examiner—J. Russell McBee
Attorney, Agent, or Firm—Staas & Halsey

[57] ABSTRACT

An anchor device for securing a rock bolt in a borehole of predetermined diameter includes an elongated plastic cartridge having a first insertable end and a second end, a side wall extending between the ends, and stiffening ribs integrally formed in the sidewall for stiffening the cartridge to permit insertion thereof into the borehole.

12 Claims, 2 Drawing Sheets

ANCHOR DEVICE FOR SECURING ROCK BOLTS

BACKGROUND OF THE INVENTION

1. Field of the Invention

The present invention relates generally to a method and apparatus for rock bolting a roof or a hanging wall in a mine, shaft, tunnel, or generally in any cavity in the rock, by means of bolts which are fastened in boreholes.

2. Description of the Related Art

The present invention relates to an improved embodiment of an anchor device for securing a rock bolt in a borehole, and as such represents an improvement to my previous U.S. Pat. No. 4,820,095, issued on Apr. 11, 1989. Basically, the device previously patented comprises an elongated cage having a perforated elongated wall confining an elongated chamber containing a bonding means for bonding the rock bolt within the borehole, the cage having a trailing end adapted to mount the anchor device onto the leading end of a rock bolt for insertion into the borehole.

FIGS. 1-6 of the patent have been reproduced herein, along with the following description of the figures.

Referring to FIG. 1, there is shown a first embodiment of the anchor device of the present invention comprising an elongated cage 1 having an elongated wall member 2 containing rectangular perforations 3 therein. Preferably, elongated wall 2 is cylindrical in shape. The elongated wall 2 confines an elongated chamber 4 which contains a bonding means such as a cartridge 5 containing a bonding composition 6. The bonding composition 6 may comprise a cement or mortar for bonding a rock bolt firmly within a borehole, but a preferred embodiment of the bonding composition is a two component chemical system comprising a resin and a hardener.

Such resins and hardeners are well known in the art. The hardener is a crosslinking agent, which upon contact and thorough intermixing with the resin will cause the resin to gel by crosslinking and thereby set-up to form a very hard bonding agent. In order to keep the hardener and the resin isolated until the moment of use, the two components are kept apart by frangible partitioning means. The partitioning means may be a frangible microencapsulation coating which may cover either one or both of the components in a plurality of intermixed microspheres. The components remain isolated from each other until the rock bolt penetrates the cartridge and crushes the microspheres. Alternatively, the partitioning means may be a plurality of elongated sheaths or bags of frangible plastic which confine the hardener and the resin separately so that they are not in contact with each other until the bags are ruptured by the rock bolt. A third method of keeping the two components from contact with each other is to provide a frangible partition member within the cartridge as an internal element thereof, which fractures as the rock bolt enters the cartridge. Since these partitioning means are all frangible, when the cartridge is ruptured, the partitioning means, not shown in FIGS. 1-6, will either tear, rupture, or fracture when the rock bolt penetrates into the cartridge, and the hardener and resin will become intermixed and react as the rock bolt passes through the length of the cartridge, the rock bolt generally being rotated to enhance mixing.

The elongated cage 1 has a leading end 7 which enters the borehole first and a trailing end which enters the borehole last. The trailing end comprises a neck down transition section 9 fixed to an elongated section 8. The bottom of resin cartridge 5 rests in the top of this neck down section 9. This neck down section 9 is in the shape of a truncated cone and the elongated section 8 is preferably cylindrical. A rock bolt 13 is forced into a central bore 11 which is contained within the elongated section 8 so that there is a tight compression fit of the rock bolt within the bore 11. The bore 11 is in open communication with the chamber 4 so that the rock bolt may eventually contact and penetrate the resin cartridge 5. In order to facilitate the penetration of the rock bolt within the bore 11 there is optionally provided at least one elongated slot 12.

The rock bolt 13 commonly will have surface ridges or teeth 14 on its outer surface which are adapted to provide an enhanced bonding surface for contact with the bonding agent which sets up in the borehole. As shown in FIG. 1, these ridges or teeth on the surface are in the configuration of a Chevron which is oriented with the apex of the Chevron pointed toward leading end 7 so as to resist the pulling of the rock bolt from the interior of the cage and from the bonding agent when the bonding agent has hardened. It is to be noted that the tight compression fit of rock bolt 13 within elongated section 8 prevents premature puncture of the resin cartridge by the rock bolt as the assembly is being pushed into the borehole.

FIG. 2 is a sectional view of the elongated cage 1 of FIG. 1 taken along line A—A. In FIG. 2, there is shown the elongated wall member 2 containing perforations 3, and confined therein is the cartridge 5 containing the bonding composition 6.

FIG. 3 is a sectional view of the elongated cage of FIG. 1 taken along sectional line B—B. There is shown in FIG. 3 the elongated section 8 at the trailing end of the cage 1 and confined therein is the rock bolt 13. Also shown is a slot 12 which allows the elongated section 8 to expand as the rock bolt enters the bore 11 of section 8.

An alternative embodiment as previously described in U.S. Pat. No. 4,820,095 is illustrated in FIG. 4, in which a cage 16 has an elongated wall 17 containing circular perforations 1. Confined within the chamber of the cage 16 is a bonding means such as cartridge 5 containing a bonding composition 6. As seen in FIG. 4, this embodiment is a substantially tubular elongated cage having a leading end 19 and a trailing end 21, with no neck down portion at the trailing end. The cartridge 5 is supported within the chamber by a pin 23 which passes through the chamber wall 17 by means of apertures 22 on opposite sides of the wall. The pin may be a solid dowel or rod, or it may be a tubular pin having a hollow center as shown in FIGS. 4 and 5. The pin has end faces 24 which are set at an angle to the axis of the pin. These end faces 24 provide pointed ends 25 on the pin in order to facilitate the insertion of the pin 23 into the holes 22 for the passage of the pins through the elongated cage 16.

Trailing end 21 of elongated cage 16 is an elongated section which contains a central bore 26 in communication with the chamber holding the cartridge 5. The bore 26 is substantially the same diameter as the bore of the chamber within the cage 16 so that a rock bolt 13 having surface ridges 14 may enter the trailing end of the cage with a loose fit. As seen in FIG. 4, when the pin has been inserted into the cage 16 the resin cartridge 5 will rest upon the top of the pin 23 and the pin will rest upon the leading end of the rock bolt 13 when the cage is oriented in a position whereby the trailing end 21 is below the leading end 19. It is to be noted that the pin prevents premature puncture of the resin cartridge by the rock bolt as the assembly is pushed down the borehole.

FIG. 5 is a sectional view of the embodiment of FIG. 4 and illustrates the various elements thereof. In particular, the pin 23 is shown with the slanted end faces 24 which provide the pointed ends 25 on the pin. Also shown are the elongated wall 17, circular perforations 18, and the cartridge 5 containing the bonding composition 6.

FIG. 6 illustates an alternate method of mounting the cage upon a rock bolt. In FIG. 6 there is shown the trailing end of the cage of FIG. 1, which comprises the elongated wall 2, the transition section 9 and an elongated section 28. The elongated section 28 has a central bore 2 which is in open communication with the chamber in which the cartridge 5 is held. The inner surface of the bore 29 is threaded with spiral threads, not shown, which are sized and adapted to mate with external threads 32 which are on the outside surface of the leading end of rock bolt 31.

Once the cage with its confined resin cartridge has been pushed all the way to the bottom of the borehole, the rock is pushed with a substantial force which is sufficient to cause the rock bolt to pass through the elongated section of the cage and penetrate the resin cartridge for the mixing and reaction of the bonding composition. In the embodiment of FIG. 1, the elongated section will expand to allow passage of the rock bolt therethrough and/or the cage 1 may fracture to allow penetration of the resin cartridge. In the embodiment of FIG. 4, the pin 23 and/or the cage 16 may fracture to allow the rock bolt to penetrate the cartridge. In the embodiment of FIG. 6, the threads on the inner surface of the bore 29 of elongated section 28 will normally shear off and/or the cage may fracture to allow penetration of the cartridge by the rock bolt.

In the device described above, in certain situations the diameter of the hole and the diameter of the bonding cartridge or similar means which needs to be used to secure the rock bolt to the walls of the hole can be very close to each other, leaving little clearance for the cage to house the bonding cartridge. This could lead to difficulties in manufacturing the product.

As an example, one size of commonly drilled hole is 25 mm in diameter, while the resin cartridge normally used in that hole size is 23 mm in diameter. The radial clearance between the hole and the bonding cartridge is only 1 mm. Allowing about 0.4 mm radial clearance for ease of insertion of the assembly into the hole (which is seldom very uniform in diameter or perfectly straight), leaves only about 0.6 mm radial clearance within which the cage must be made. Knowing that a radial clearance of at least 0.3 mm is also necessary to allow assembly of the resin cartridge or bonding means within the confines of the cage (without damaging or tearing the cartridge), it becomes necessary to ensure that the wall thickness of the cage is no more than 0.3 mm. This limitation makes it practically difficult and potentially expensive to manufacture the complete device.

SUMMARY OF THE INVENTION

An object of the present invention is to provide an improved anchor device for securing rock bolts in which the overall structure is relatively easy to manufacture and assemble.

Another object of the present invention is to provide an improved anchor device for securing rock bolts, in which the cage and the bonding means are integrated in a single structure, thus obviating the need for retaining means, such as pins or crimping.

Another object of the present invention is to provide an improved anchor device for securing rock bolts in which an integrated cage structure would be used to eliminate assembly steps, whereby a cartridge would no longer have to be assembled into a cage.

These and other objects of the invention are met by providing an anchor device for securing a rock bolt in a borehole, the anchor device including an elongated stiffening cage of predetermined length and made of interconnected ribs which form a substantially cylindrically shaped sleeve with spaces provided between individual ribs, and having a central bore and two opposite axial ends, a cylindrical thin film of frangible plastic material connected to the cage and covering the spaces between the individual ribs for at least a portion of the length of the cage, a frangible transverse partition disposed between the opposite axial ends of the cage and being integrally formed with the cylindrical thin film, and a closure formed at one of the ends of the cage, a compartment being formed between the partition and the closure for containing a bonding agent, the bonding agent being released when a rock bolt is inserted into the end of the cage opposite the closure and forced into the compartment through the transverse partition.

These and other features and advantages of the anchor device according to the present invention will become more apparent with reference to the following detailed description and drawings.

DETAILED DESCRIPTION OF THE PREFERRED EMBODIMENTS

Figure 1:
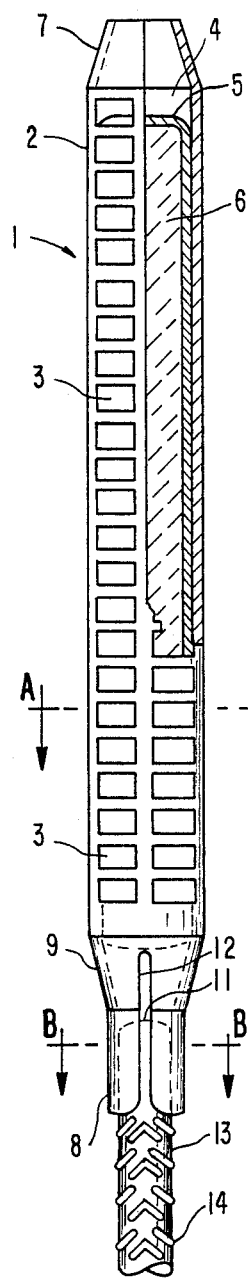
FIG. 1 is an elevational view, partly in section, illustrating a known embodiment upon which the present invention improves.
Figure 4:
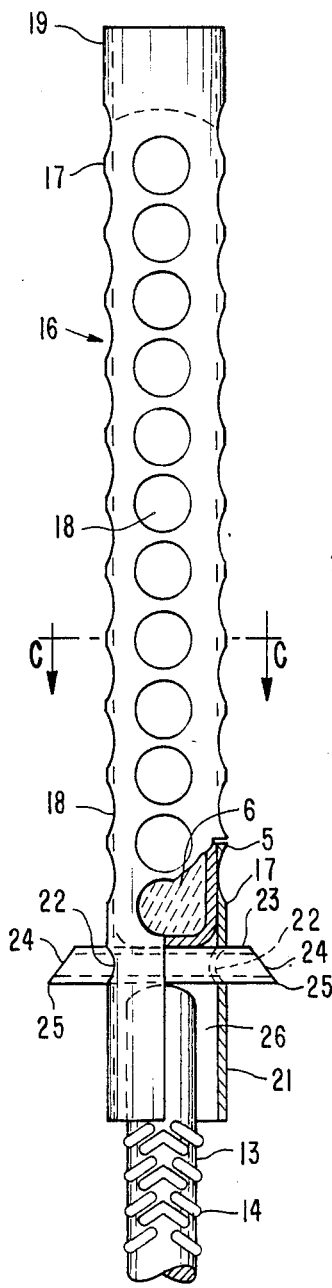
FIG. 4 is an elevational view, partly in section, of a second embodiment of the known device illustrated in FIG. 1 upon which the present invention improves.
Figure 2:
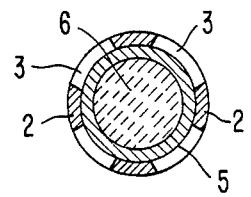
FIG. 2 is a sectional view of the device of FIG. 1 taken along section line A—A.
Figure 3:
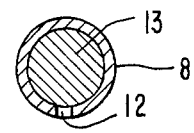
FIG. 3 is a sectional view of the embodiment of FIG. 1 taken along section line B—B.
Figure 5:
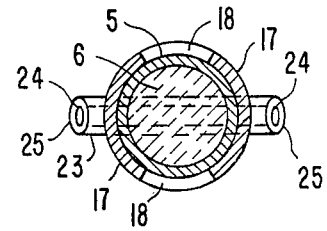
FIG. 5 is a sectional view of the embodiment of FIG. 4 taken along section line C—C.
Figure 6:
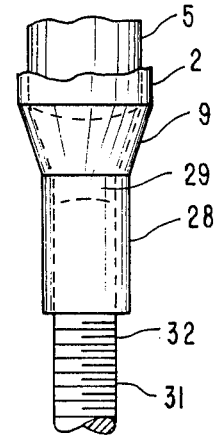
FIG. 6 is an elevational view of the trailing end of the embodiment of FIG. 1, illustrating alternative mounting means.
Figure 7:
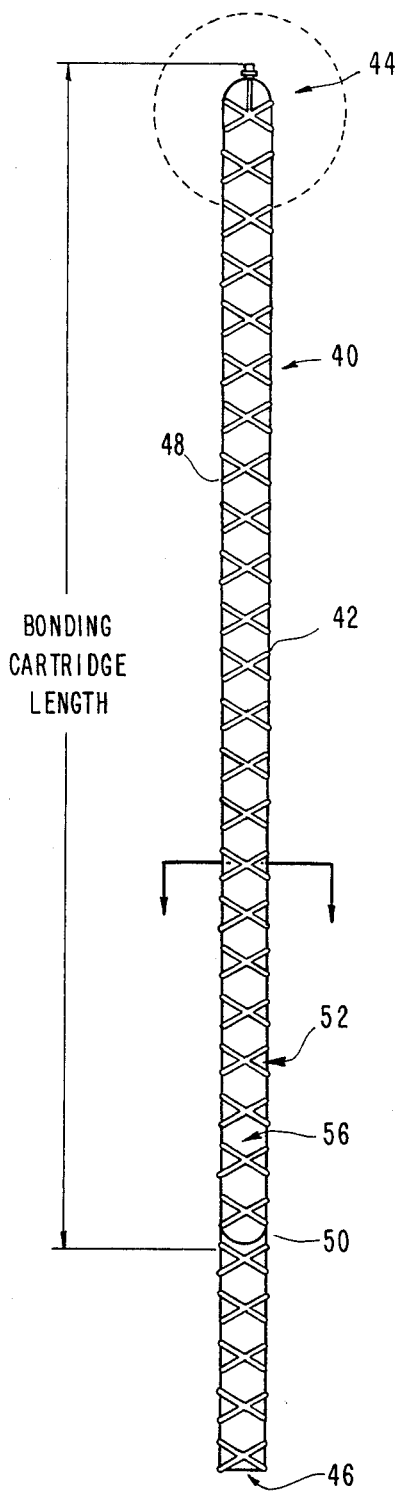
FIG. 7 is a side elevational view of a first, preferred embodiment of the present invention.
Figure 8:
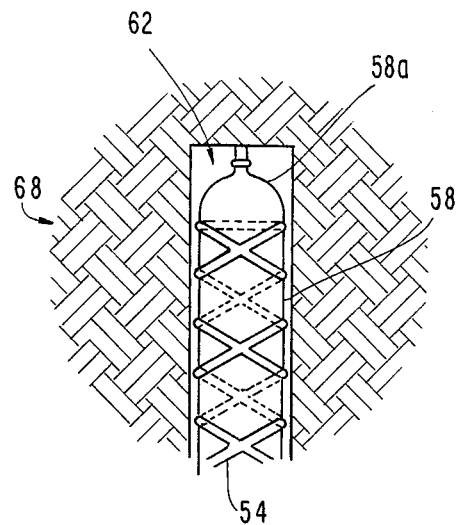
FIG. 8 is an enlarged view of the inserted end of the device of FIG. 7.
Figure 9:
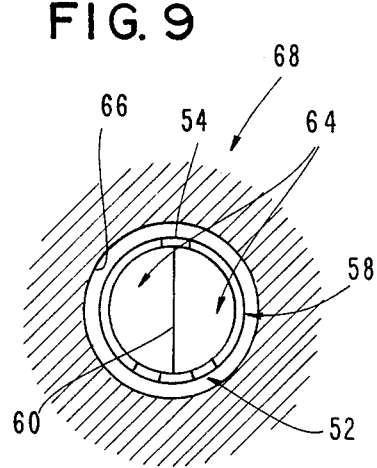
FIG. 9 is a sectional view of the embodiment of FIG. 7 taken along section line D—D.

Referring now to FIGS. 7-9, an anchor device for securing a rock bolt in a borehole according to the present invention is generally referred to by the numeral 40. The device is essentially an elongated cylindrically shaped sleeve 42 having an insertable end 44 and an opposite end 46. A bonding cartridge 48 illustrated in FIG. 7 is a particular segment of the sleeve 42 which is to be filled with bonding material. In order to create a compartment within which bonding material is filled, the portion of the sleeve corresponding the length of the bonding cartridge 48 has a solid cylindrical wall which, as will be described in greater detail below, represents the integral bonding of a ribbed cage and a thin film.

A transverse partition 50 is located between the opposite axial ends of the sleeve and provides a bottom for the compartment which contains bonding agent. Once the bonding agent is loaded into the compartment, a closure 62 is formed at the top of the sleeve, preferably by crimping the top of the sleeve. In the enlarged view of FIG. 8, the closure is actually a crimped portion of the thin film which extends beyond the ribbed cage. However, it would be possible to crimp the cage structure as well to form the closure with the rib structure crimped therewith.

The sleeve 42 has an elongated stiffening cage 52 of predetermined length and made of interconnected ribs 54 which collectively form a substantially cylindrically shaped structure with spaces 56 provided between the ribs. A central bore extends through the cage which, in the illustrated embodiment, extends the full length of the sleeve 42. Thus, the cage has open opposite axial ends.

A cylindrical thin film 58 of frangible plastic material is connected to the cage 52, preferably by integrally molding the two components in an injection molding process. The thin film is a frangible plastic material which covers the spaces 56 between the ribs 54. The plastic thin film is thus cylindrical since it conforms to the shape of the cage (with the ribs being embedded) in the thin film. When a rock bolt is inserted into the compartment which contains bonding agent, the bonding agent is forced through the thin film and radially outwardly from between the ribs.

The transverse partition 50 is also frangible and is preferably formed in the same injection molding process so that it is integrally formed with the ribbed cage and the thin film. As illustrated in FIG. 8, the thin film has a portion 58a which extends beyond the upper extremity of the cage structure. This portion 58a is then crimped after the bonding agent is loaded into the compartment.

FIG. 9 shows a preferred embodiment in which an axial partition 60 extends between the transverse partition 50 and the closure 62 so as to form two subcompartments 64, each of which receives one of a two-component bonding agent. Preferably, the two component bonding agent is a resin and a hardener. As can be seen in FIG. 9, once the partition 60 has been broken due to insertion of the rock bolt into the compartment, the two components of the bonding agent will become admixed (generally as the rock bolt is rotated therein) and will be forced through the thin film 58 outwardly between the ribs 54. Then, the bonding agent will adhere to the surface 66 of the borehole which has been drilled in a rock formation 68.

Thus, the thin film 58 provides a thin outer wall, substantially cylindrically shaped, which is frangible when the bolt is inserted into the compartment. This wall is integrally formed with the stiffening ribs so as to avoid assembly steps required in the devices illustrated in FIGS. 1–6. Also, the present invention avoids having to use stop pins which are required in the devices of FIGS. 1–6 to prevent the cartridge from falling out of the stiffening cage. This is an important feature since the boreholes are usually drilled in a ceiling and the bonding cartridge has to be pushed into the borehole from below. Thus, in the previously patented invention, the cage and the bonding means are two separate items that need to be assembled. In the use of this device in mining practice, a "resin cartridge" which includes a divided plastic sausage-shaped tube, confining a two-component bonding adhesive, is inserted into a cage and held in place either by means of a retaining pin or by crimping the cage.

In contrast, the present invention provides that the plastic cartridge itself is made with ribbing that is integrally formed in the cylindrical sidewall, thus forming part of the outer wall of the cartridge, as shown in FIGS. 7–10. This ribbing that forms the cage preferably extends past the length of the tubing necessary for holding the resin bonding adhesive. The bonding adhesive would still be confined primarily within a thin plastic film or suitable material, as is done commercially, but its outer wall would be stiffened significantly by incorporating the ribbed cage therein. This structure prevents the cartridge from bending easily, and thus facilitates insertion of the anchor device into the borehole. The extended length of the cage referred to above (i.e., that portion of the cage which does not contain bonding agent) is preferred in order that the bonding adhesive could be mounted on the end of a rock bolt for uses and purposes previously described in my previous patent.

With the structure described in FIGS. 7–9, there would be no need to provide clearance between the resin cartridge and its cage, since they are integrally formed, thereby permitting the ribbing to be thick and stiff. Also, the assembly stage required to put the cage and the cartridge together would be eliminated since the process of filling the tubing with bonding adhesive components will form the complete bonding and cage assembly, thereby reducing manufacturing costs. Moreover, there would be no need to reduce the diameter of the extended length of the cage or to provide a pin to hold the bonding means within the confines of the cage, thereby resulting in further cost savings.

While the devices described in my previous patent are very useful, the present invention has advantages in smaller-diameter boreholes.

Numerous modifications and adaptations of the present invention will be apparent to those so skilled in the art and thus, it is intended by the following claims to cover all such modifications and adaptations which fall within the true spirit and scope of the invention.

What is claimed is:

1. An anchor device for securing a rock bolt in a borehole of predetermined diameter, the device comprising:
    an elongated plastic cartridge having a first insertable end and a second end, a side wall extending between the ends, and stiffening means integrally formed in the side wall for stiffening the cartridge to permit insertion thereof into the borehole;
    a top wall provided near the first, insertable end of the cage; and
    a bottom wall disposed between the first and second ends of the cartridge, a compartment for receiving a bonding agent being formed between the top and bottom walls, said bottom wall being spaced axially from the second end of the cartridge to form an extended portion of the cartridge which receives the anchor bolt to be secured in the borehole, said compartment being frangible to release the bonding agent upon insertion of the rock bolt into the compartment through the extended portion of the cartridge.

2. An anchor device according to claim 1, wherein the stiffening means is a ribbed cage having the side wall of the cartridge integrally molded therewith.

3. An anchor device according to claim 1, further comprising an axially disposed partition disposed between the top wall and the bottom wall to form two semi-compartments, each receiving one of component of a two-component bonding agent.

4. An anchor device according to claim 3, wherein the two-component bonding agent comprises a resin and a hardener, and wherein the partition is frangible to permit admixing of the two components upon insertion of the rock bolt into the compartment.

5. An anchor device according to claim 2, wherein the cage forms an axial bore having an inner diameter sized slightly greater than an outer diameter of the rock bolt.

6. An anchor device according to claim 2, wherein the sidewall of the cartridge between the ribbed cage is frangible when the rock bolt is inserted therein.

7. An anchor device according to claim 4, wherein said two components of the bonding agent react when admixed to produce a hardenable adhesive which comes into contact with walls of the borehole, thereby bonding the rock bolt within the borehole.

8. An anchor device for securing a rock bolt in a borehole, said anchor device comprising:

an elongated stiffening cage of predetermined length and made of interconnected ribs forming a substantially cylindrically shaped sleeve with spaces provided between ribs, and having a central bore and two opposite axial ends;

a cylindrical thin film of frangible plastic material connected to the cage and covering the spaces between the ribs for at least a portion of the length of the cage;

a frangible transverse partition disposed between the opposite axial ends of the cage and being integrally formed with the cylindrical thin film; and a closure formed at one of the ends of the cage, a compartment being formed between the partition and the closure for containing a bonding agent, the bonding agent being released when a rock bolt is inserted into the end of the cage opposite the closure and forced into the cage compartment through the transverse partition.

9. An anchor device according to claim 8, further comprising an axial partition extending between the transverse partition and the closure to form two sub-compartments, wherein the bonding agent is a two-compartment bonding agent, each sub-compartment receiving one component of the two-component bonding agent.

10. An anchor device according to claim 9, wherein the two-component bonding agent comprises a resin and a hardener which are admixed when the rock bolt is forced into the compartment.

11. An anchor device according to claim 9, wherein the cage, the cylindrical thin film and the transverse partition are integrally formed.

12. An anchor device according to claim 9, wherein the closure is a crimp applied to the end of the cage after loading the bonding agent.

* * * * *